United States Patent
Qian et al.

(12)

(10) Patent No.: US 10,860,847 B2
(45) Date of Patent: Dec. 8, 2020

(54) VISUAL PERCEPTION ASSISTANT

(71) Applicant: MOTOROLA MOBILITY LLC, Chicago, IL (US)

(72) Inventors: Ming Qian, Cary, NC (US); Yunming Wang, Buffalo Grove, IL (US); Erin Wang, Cary, NC (US)

(73) Assignee: Motorola Mobility LLC, Chicago, IL (US)

( * ) Notice: Subject to any disclaimer, the term of this patent is extended or adjusted under 35 U.S.C. 154(b) by 42 days.

(21) Appl. No.: 15/785,644

(22) Filed: Oct. 17, 2017

(65) Prior Publication Data

US 2019/0114474 A1 Apr. 18, 2019

(51) Int. Cl.
| | | |
|---|---|---|
| G06K 9/00 | (2006.01) |
| G10L 15/22 | (2006.01) |
| G06F 3/16 | (2006.01) |
| H04N 5/272 | (2006.01) |
| G06F 40/35 | (2020.01) |

(52) U.S. Cl.
CPC ......... G06K 9/00369 (2013.01); G06F 3/167 (2013.01); G06K 9/00342 (2013.01); G06K 9/00771 (2013.01); G10L 15/22 (2013.01); G06F 40/35 (2020.01); G06K 9/00671 (2013.01); H04N 5/272 (2013.01)

(58) Field of Classification Search
None
See application file for complete search history.

(56) References Cited

U.S. PATENT DOCUMENTS

| | | | | |
|---|---|---|---|---|
| 7,590,541 B2* | 9/2009 | Virji | ........................ | G10L 15/26 700/17 |
| 2006/0217979 A1* | 9/2006 | Pahud | ..................... | G06T 13/00 704/257 |
| 2010/0086200 A1* | 4/2010 | Stankiewicz | ........ | G06K 9/4671 382/154 |
| 2014/0280044 A1* | 9/2014 | Huynh | ................ | G06F 16/3323 707/722 |
| 2014/0310595 A1* | 10/2014 | Acharya | .................. | G06F 9/453 715/706 |
| 2014/0363048 A1* | 12/2014 | Vrcelj | ...................... | G06K 9/78 382/103 |
| 2015/0244850 A1* | 8/2015 | Rodriguez | ............. | G01C 21/20 455/556.1 |
| 2018/0248995 A1* | 8/2018 | Rhoads | ................... | G01C 21/00 |
| 2018/0293050 A1* | 10/2018 | Bolden | ................... | G06F 3/017 |
| 2018/0321826 A1* | 11/2018 | Bereza | ................ | G06F 3/04883 |

* cited by examiner

*Primary Examiner* — Nancy Bitar
(74) *Attorney, Agent, or Firm* — Yudell Isidore PLLC

(57) ABSTRACT

A method, a system, and a computer program product for visually identifying the at least one target subject within a real-time view of a current scene. The method includes capturing, by at least one image sensor, a real-time view of a current scene. The method further includes performing a visual analysis of the real-time view to identify at least one subject. The method further includes: receiving, in real-time, a natural language input which includes verbal utterances of at least one speaker; and identifying, within the natural language input, a description of at least one particular subject. The method further includes: analyzing the current scene to identify at least one target subject that matches the description of the at least one particular subject; and in response to identifying the at least one target subject, applying at least one visual identifier to the real-time view of the current scene.

20 Claims, 8 Drawing Sheets

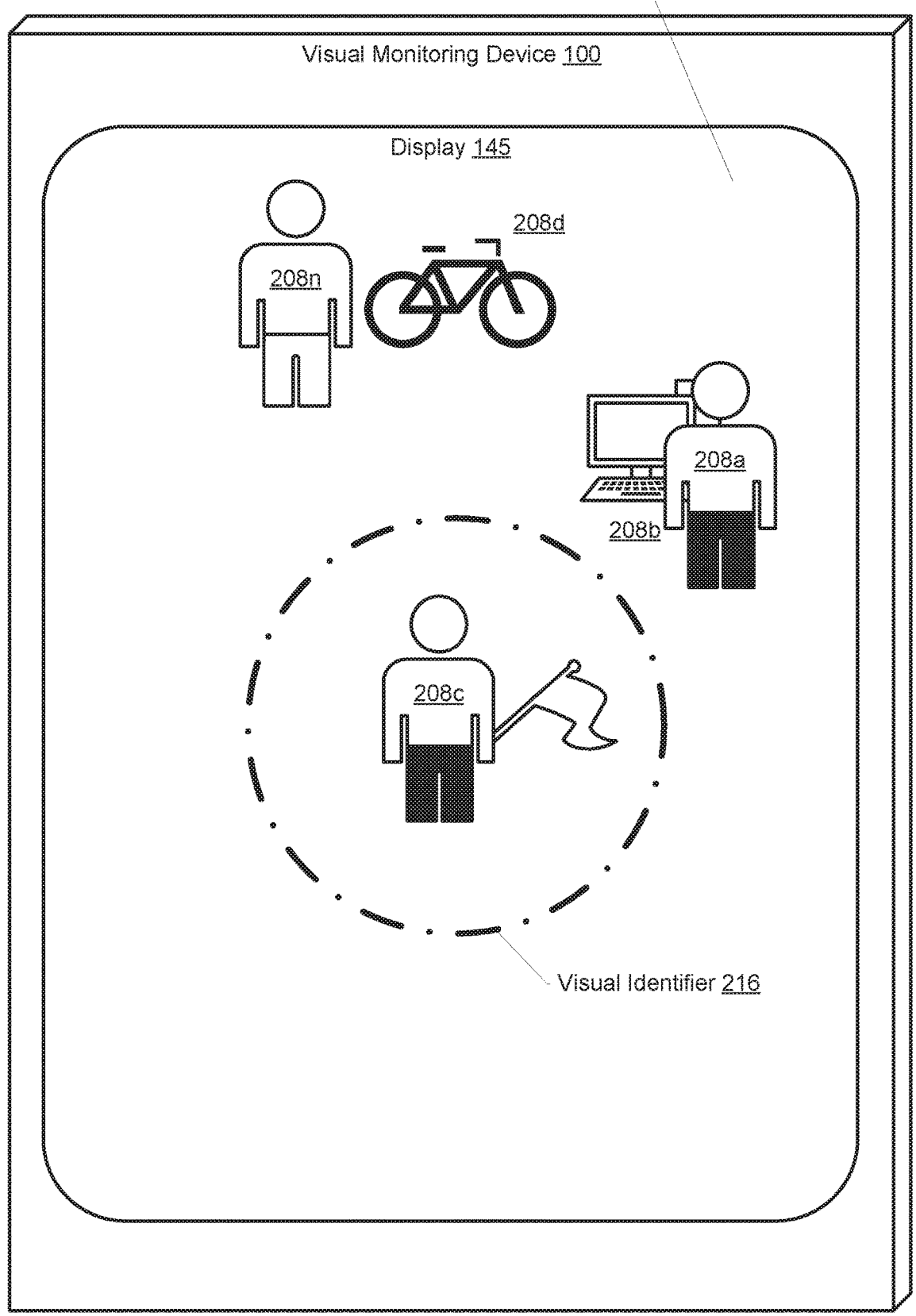

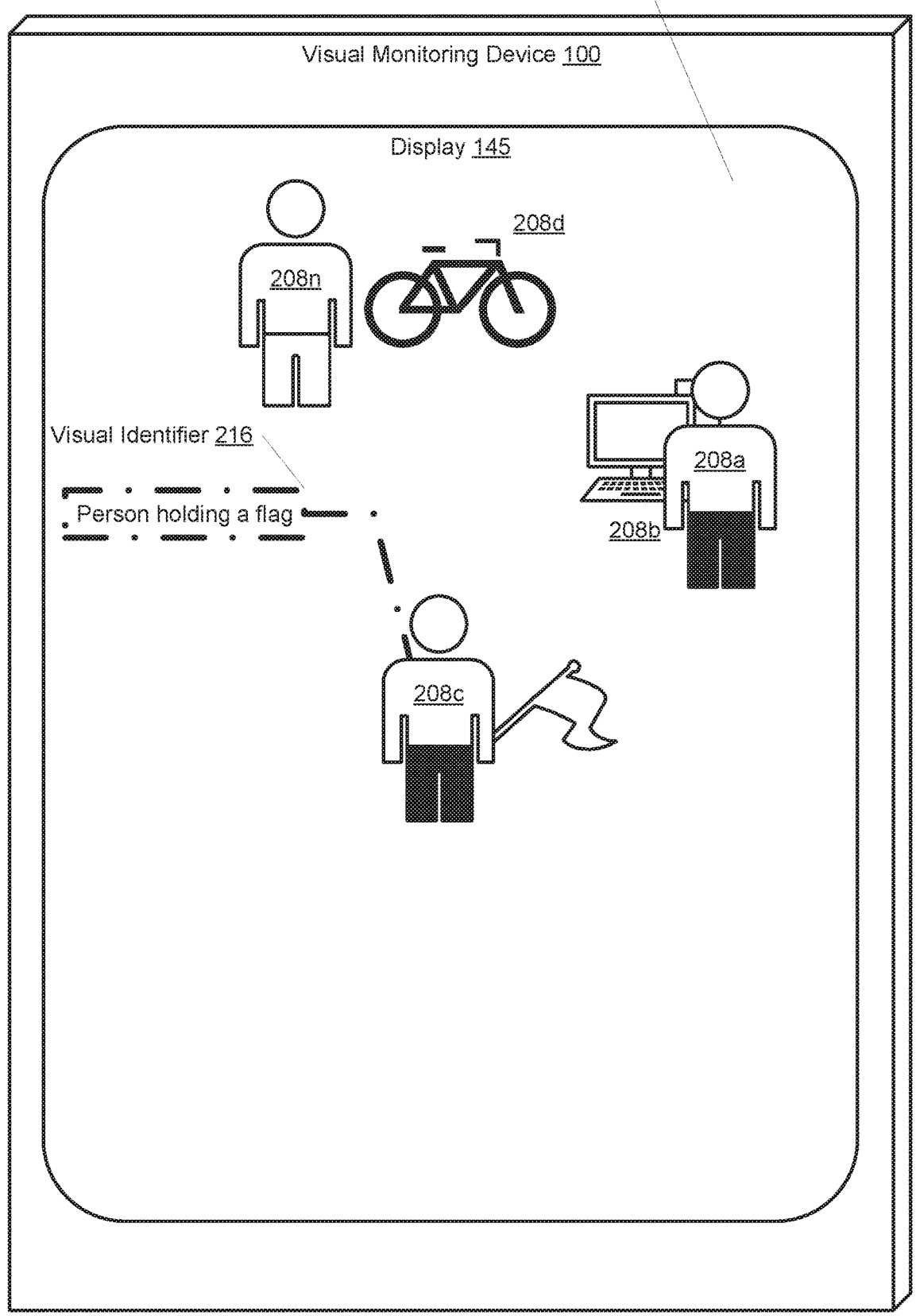

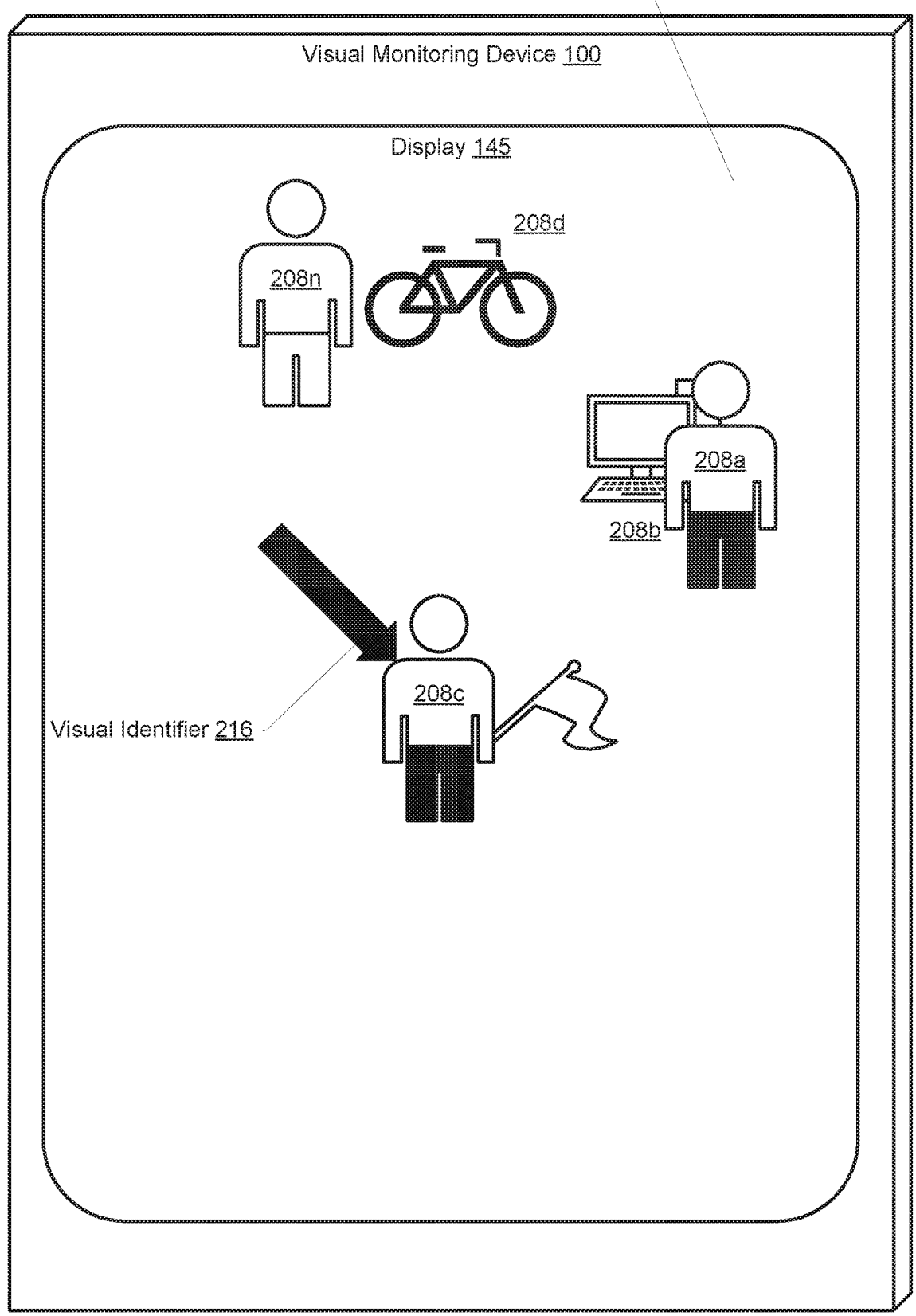

VISUAL PERCEPTION ASSISTANT

BACKGROUND

1. Technical Field

The present disclosure generally relates to devices having image sensors and in particular to a method for applying a visual identifier to target subjects within a current scene.

2. Description of the Related Art

Modern video monitoring systems can be used to monitor a scene and identify subjects of interest. Many current solutions use artificial intelligence to recognize various objects in the scene. However, modern video monitoring systems frequently misidentify objects within a scene as target objects, when other objects within the scene are the actual subjects of interest to a user. Additionally, many current solutions are also unable to distinguish important objects within a scene from insignificant objects.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4A illustrates a first example enhanced real-time view of a captured scene, in accordance with one or more embodiments;

FIG. 4B illustrates a second example enhanced real-time view of a captured scene, in accordance with one or more embodiments;

FIG. 4C illustrates a third example enhanced real-time view of a captured scene, in accordance with one or more embodiments;

DETAILED DESCRIPTION

Figure 1:
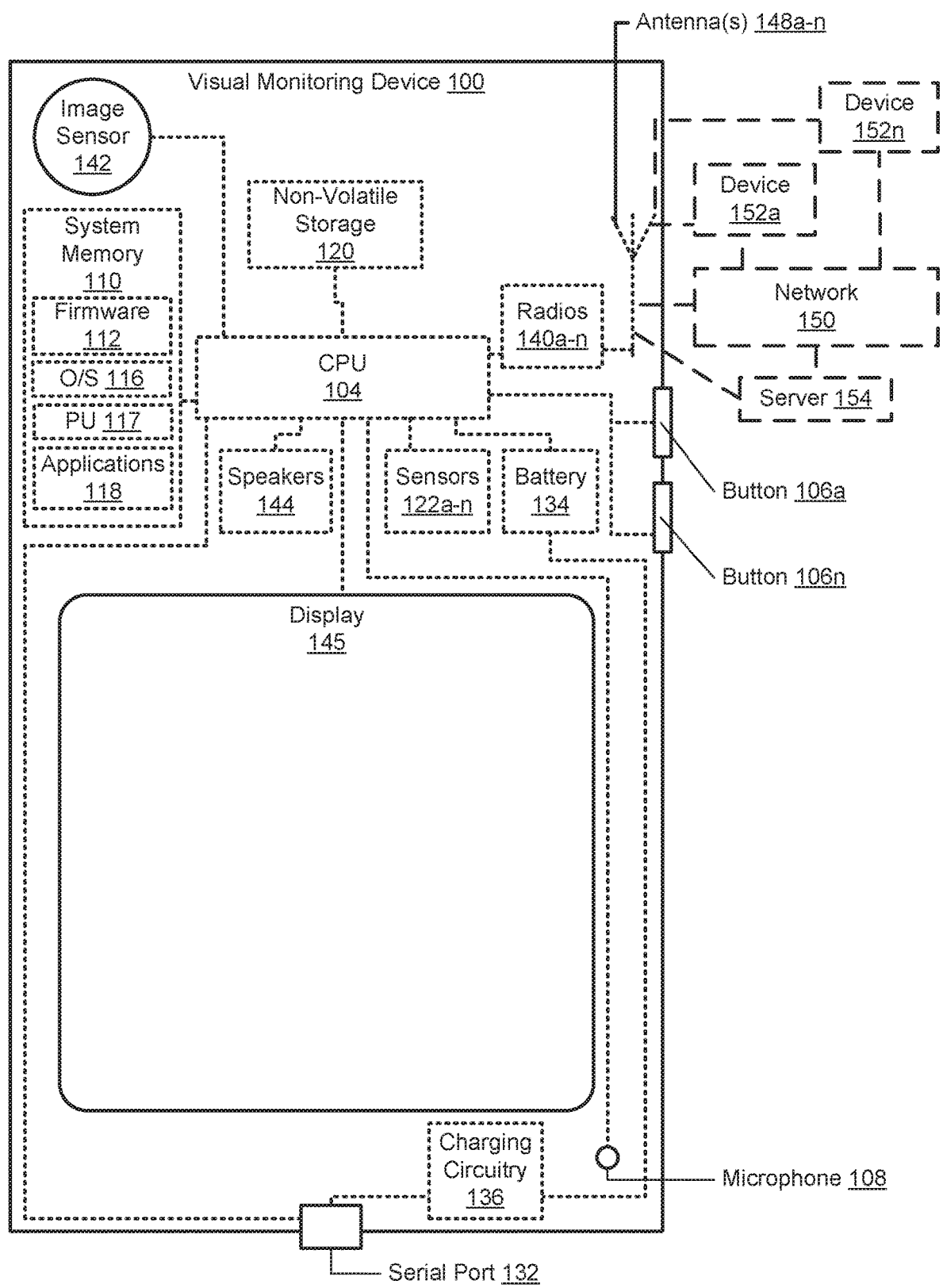
FIG. 1 illustrates an example visual monitoring device within which certain aspects of the disclosure can be practiced, in accordance with one or more embodiments.

The illustrative embodiments provide a method, a system, and a computer program product for visually identifying the at least one target subject within a real-time view of a current scene. The method includes capturing, by at least one image sensor, a real-time view of a current scene. The method further includes performing a visual analysis of the real-time view of the current scene to identify at least one subject within the current scene. The method further includes: receiving, in real-time, a natural language input which includes verbal utterances of at least one speaker; and identifying, within the natural language input, a description of at least one particular subject. The method further includes: analyzing the current scene to identify at least one target subject from among the at least one subject that matches the description of the at least one particular subject; and in response to identifying the at least one target subject, applying, to the real-time view of the current scene, at least one visual identifier that increases a visibility of the at least one target subject within the real-time view of the current scene.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within visual monitoring device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example visual monitoring device 100 within which one or more of the described features of the various embodiments of the disclosure can be implemented. In one embodiment, visual monitoring device 100 can be any electronic device that is equipped with and/or connected to at least one image sensor. For example, visual monitoring device 100 can include, but is not limited to, a desktop computer, a monitor, a notebook computer, a mobile phone, a virtual reality headset, a digital camera, a video recorder, or a tablet computer. Visual monitoring device 100 includes at least one processor or central processing unit (CPU) 104. CPU 104 is coupled to non-volatile storage 120 and system memory 110, within which firmware 112, operating system (OS) 116, perception utility (PU) 117, and applications 118 can be stored for execution by CPU 104. In one or more embodiments, applications 118 include a video stream application for recording and/or displaying on an output device (e.g., display 145) a real-time video stream captured by at least one camera (e.g., image sensor 142). According to one aspect, PU 117 executes within visual monitoring device 100 to perform the various methods and functions described herein. In one or more embodiments, PU 117 analyzes a real-time view of a current scene and visually identifies at least one target subject within the real-time view. For simplicity, PU 117 is illustrated and described as a stand-alone or separate software/firmware/logic component, which provides the specific functions and methods described below. However, in at least one embodiment, PU 117 may be a component of, may be combined with, or may be incorporated within firmware 112, or OS 116, and/or within one or more of applications 118.

As shown, visual monitoring device 100 may include input devices and output devices that enable a user to interface with visual monitoring device 100. In the illustrated embodiment, visual monitoring device 100 includes image sensor 142, display 145, hardware buttons 106a-n, microphone 108, and speaker 144. Image sensor 142 can be used to capture real-time image and/or video data in a current scene. In one embodiment, image sensor 142 includes at least one internal image sensor of visual monitoring device 100. In another embodiment, image sensor 142 includes at least one external image sensor, such as a wireless network image sensor, that is connected to visual monitoring device 100 via a wired and/or wireless network connection. Hardware buttons 106a-n are selectable buttons which are used to receive manual/tactile input from a user to control specific operations of visual monitoring device 100 and/or of applications executing thereon. In one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of visual monitoring device 100. In one embodiment, hardware buttons 106a-n may include a keyboard. Microphone 108 may be used to receive spoken input/commands from a user. In one embodiment, microphone 108 includes at least one internal microphone of visual monitoring device 100. In another embodiment, microphone 108 includes at least one external microphone, such as a wireless microphone, that is connected to visual monitoring device 100 via a wired and/or wireless network connection. Speaker(s) 144 is used to output audio.

CPU 104 is also coupled to sensors 122a-n and display 145. Sensors 122a-n can include, but are not limited to including, at least one of: infrared (IR) sensors, time-of-flight emitters/receivers, structured light emitters/receivers, thermal sensors, light sensors, motion sensors and/or accelerometers, proximity sensors, and camera/image sensors. Display 145 is capable of displaying text, media content, including images and video, and/or a graphical user interface (GUI) associated with or generated by firmware and/or one or more applications executing on visual monitoring device 100. In one embodiment, display 145 includes at least one internal display/monitor of visual monitoring device 100. In another embodiment, display 145 includes at least one external display, such as a remotely connected monitor, that is connected to visual monitoring device 100 via a wired and/or wireless connection. The GUI can be rendered by CPU 104 for viewing on display 145, in one embodiment, or can be rendered by a graphics processing unit (GPU) (not illustrated), in another embodiment. In one or more embodiments, display 145 presents a real-time view that is being monitored/captured by image sensor 142. In one embodiment, display 145 is a touch screen that is also capable of receiving touch/tactile input from a user of visual monitoring device 100, such as when the user is interfacing with a displayed (or partially displayed) GUI. In at least one embodiment, visual monitoring device 100 can include a plurality of virtual buttons or affordances that operate in addition to, or in lieu of, hardware buttons 106a-n. For example, visual monitoring device 100 can be equipped with a touch screen interface and provide, via a GUI, a virtual keyboard or other virtual icons for user interfacing therewith.

Visual monitoring device 100 also includes serial port 132 (e.g., a universal serial bus (USB) port), battery 134, and charging circuitry 136. Serial port 132 can operate as a charging port that receives power via an external charging device (not pictured) for charging battery 134 via charging circuitry 136. Battery 134 may include a single battery or multiple batteries for providing power to components of visual monitoring device 100. In one embodiment, battery 134 may include at least one battery that is removable and/or replaceable by an end user. In another embodiment, battery 134 may include at least one battery that is permanently secured within/to visual monitoring device 100. Serial port 132 may also function as one of an input port, an output port, and a combination input/output communication port.

Visual monitoring device 100 may also include one or more wireless radios 140a-n and can include one or more antenna(s) 148a-n that enable visual monitoring device 100 to wirelessly connect to, and transmit and receive voice and/or data communication to/from, one or more other devices, such as devices 152a-n and server 154. As a wireless device, visual monitoring device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, visual monitoring device 100 may be further equipped with infrared (IR) device (not pictured) for communicating with other devices using an IR connection. In another embodiment, wireless radios 140a-n may include a short-range wireless device, including, but not limited to, a near field communication (NFC) device. In still another embodiment, visual monitoring device 100 may communicate with one or more other device(s) using a wired or wireless USB connection.

Figure 2:
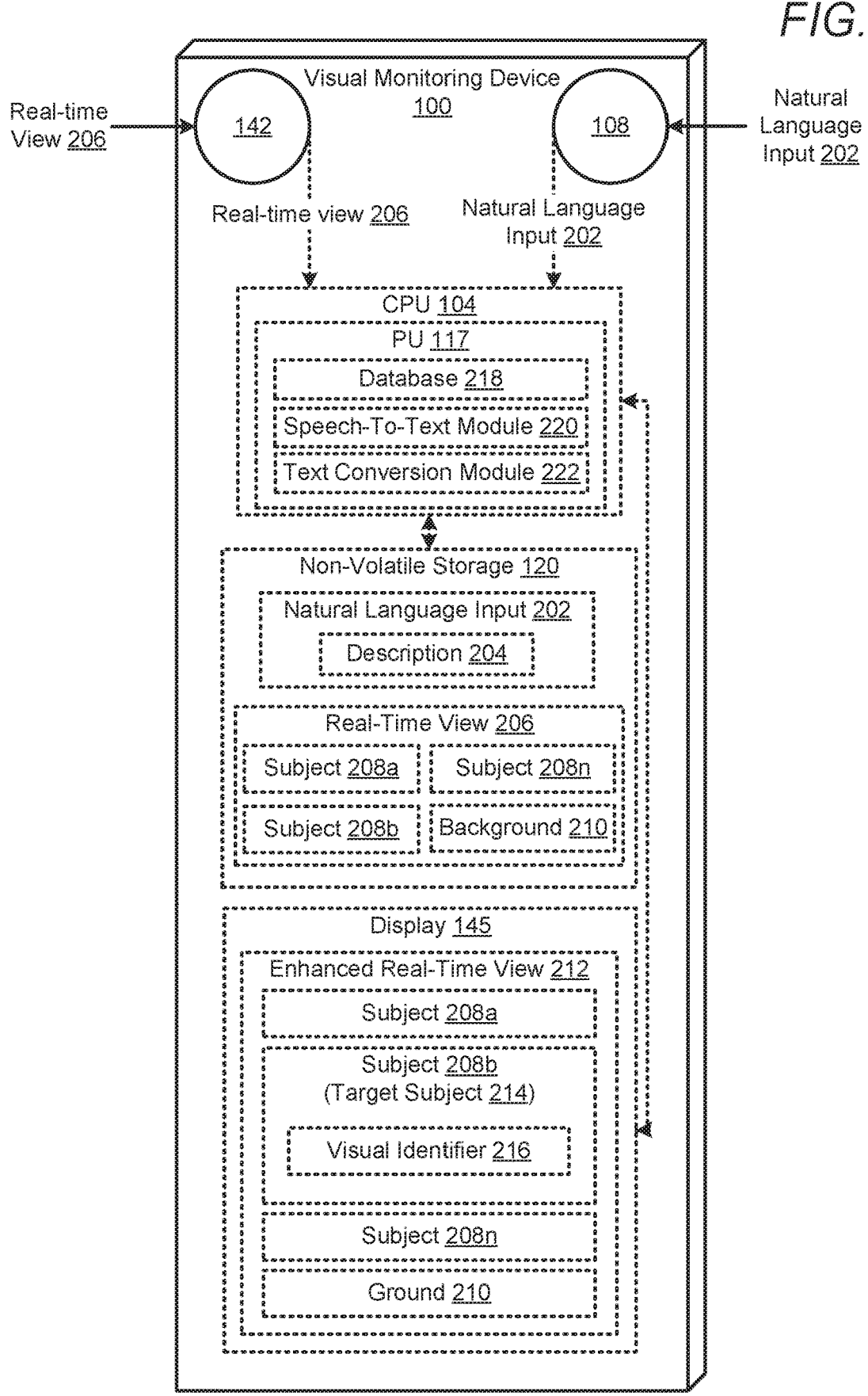
FIG. 2 illustrates an example visual monitoring device that is configured to visually identifying at least one target subject within a real-time view of the current scene, in accordance with one or more embodiments of the disclosure.

FIG. 2 is a block diagram illustrating additional functional components within example visual monitoring device 100, in accordance with one or more embodiments of the present disclosure. Visual monitoring device 100 is configured to visually identify at least one target subject within the real-time view of a current scene. As illustrated, visual monitoring device 100 includes CPU 104, which executes PU 117. Visual monitoring device 100 also includes non-volatile storage 120, display 145, image sensor 142, and microphone 108. In one or more embodiments, image sensor 142 is utilized by CPU 104 to capture real-time view 206 of a current scene (e.g., scene 302) that includes a plurality of objects. These objects may include inanimate objects or living beings, such as persons or animals. Display 145 is used to display real-time view 206 captured by image sensor 142. In one or more embodiments, microphone 108 is utilized by CPU 104 to capture natural language input 202.

In one or more embodiments, CPU 104 performs a visual analysis of the current scene to identify subjects 208a-n and background 210 from among the plurality of objects in the current scene. Subjects 208a-n are objects (real and/or inanimate) within the current scene that are a focus of attention. Subjects 208a-n can include stationary objects and/or moving objects within the current scene. As utilized herein, background 210 refers to the lowest surface viewable within the scene, which is also the surface on or above which the subjects are located. Background 210 can also be utilized to refer to objects or scenery behind other objects in a foreground of the current scene. For example, background 210 can be a wall behind one or more objects in the scene.

In one or more embodiments, CPU 104 compares identified shapes in real-time view 206 to a database of objects (not illustrated) to identify objects within a scene. CPU 104 may then determine subjects 208a-n and/or background 210 from among the identified objects based on a variety of factors including, but not limited to: a movement, position, orientation, size, shape, composition, and/or luminance of each object. In one embodiment, visual monitoring device 100 may be configured to identify particular types of subjects 208a-n, such as persons, within real-time view 206. In another embodiment, visual monitoring device 100 may receive an input from an input device that specifies particular types of subjects 208a-n to identify within real-time view 206.

In one or more embodiments, CPU 104 receives natural language input 202 from microphone 108 while image sensor 142 is capturing real-time view 206. In one embodiment, natural language input 202 includes verbal utterances spoken by one or more persons within an audible range of microphone 108. In embodiments in which natural language input 202 includes verbal utterances spoken by one or more persons, CPU 104 utilizes speech-to-text module 220 of PU 117 to perform a real-time speech-to-text conversion of the verbal utterances recorded by microphone 108 to convert natural language input 202 into text. In one or more embodiments, speech-to-text module 220 is capable of converting from any of a plurality of unique languages to a particular configured language of visual monitoring device 100 (e.g., a system default language or a programming language associated with PU 117). In one embodiment, CPU 104 continually records audio via microphone 108 to capture natural language input 202. In another embodiment, CPU 104 may receive an input by at least one input device that causes microphone 108 to begin capturing natural language input 202.

In another embodiment, natural language input 202 is text that is entered by at least one input device, such as a physical keyboard or on-screen keyboard of a touch-screen display. In embodiments in which natural language input 202 includes text entered by an input device, CPU 104 may utilize text conversion module 222 of PU 117 to convert any text input in a first language of a plurality of unique languages into a particular configured language of visual monitoring device 100 (e.g., a system default language or a programming language associated with PU 117), if needed.

While image sensor 142 is capturing real-time view 206, CPU 104 dynamically analyzes the text of natural language input 202 in real-time to determine description 204 of at least one particular subject. CPU 104 analyzes natural language input 202 to identify one or more subjects that are the focus of attention in the current scene, a description of the one or more subjects, and/or a description of the object relative to background 210 in the current scene. CPU 104 may further differentiate subjects within the current scene from other objects based on at least one prepositional phrasing in natural language input 202. For example, for a current scene having a bicycle in front of a building, CPU 104 may analyze a portion of natural language input 202 that recites "the bike is in front of the building" and identify, within description 204, the bike as a subject (e.g., subject 208) while identifying the building as background 210.

Description 204 may further describe a location and/or configuration of the at least one particular subject in the current scene. Description 204 may also include an appearance or look of the at least one particular subject in the current scene. As another example, description 204 may include the relationship of the at least one particular subject to another object in the current scene. In one or more embodiments PU 117 may include database 218 which provides a listing of a plurality of relationship terms and/or phrases (e.g., in front, to the right) and a description of each relationship terms and/or phrases that enables CPU 104 to determine from description 204 when a spatial relationship exists between a first subject and a second subject in the current scene. CPU 104 can then identify a location of a second subject within real-time view 206 based on description 204 and a location of a first subject.

In response to receiving and evaluating description 204 of the at least one particular subject, CPU 104 analyzes the current scene to identify a corresponding target, target subject 214, from among subjects 208*a-n*, that matches the received description 204. For example, if description 204 describes a particular subject as "wearing white pants and standing to the left of a bicycle", CPU 104 would identify, from among subjects 208*a-n* identified within real-time view 206, a subject (e.g., subject 208*n*) within real-time view 206 that is (1) wearing white pants and (2) is standing to the left of a bicycle as target subject 214. In one or more embodiments, CPU 104 may determine matching score between description 204 and at least one of subjects 208*a-n*. The matching score indicates a level of confidence in a determined match. CPU 104 may also compare the matching score to a predetermined matching threshold (e.g., 80% match). In this embodiment, CPU 104 may only identify a subject (e.g., subject 208*n*) as target subject 214 if the matching score meets or exceeds the predetermined matching threshold.

In one or more embodiments, in response to being unable to identify target subject 214 from description 204, CPU 104 can provide a notification to at least one output device (e.g., display 145) that indicates that target subject 214 could not be found. In one embodiment, the notification may also include a request for input of additional natural language to differentiate between the various potential target subjects. In response to receiving additional natural language input that enables CPU 104 to conclusively identify target subject 214, CPU 104 dynamically applies visual identifier 216 to target subject 214.

In response to identifying target subject 214, CPU 104 renders/applies a visual identifier (visual identifier 216) to target subject 214 within the real-time view 206. Visual identifier 216 is an object or effect that is applied to real-time view 206 to increase a visibility of target subject 214 within the real-time view of the current scene. In one embodiment, visual identifier 216 includes a rendered object that is super imposed onto real-time view 206 in a location proximate to target subject 214. For example, in rendering visual identifier 216, CPU 104 dynamically renders a geometric shape, such as a circle or oval, around target subject 214 within real-time view 206. In another example, CPU 104 renders an arrow that points at target subject 214 within real-time view 206. In one embodiment, visual identifier 216 includes a visual effect that is dynamically applied to a particular region of real-time view 206 that includes target subject 214. For example, CPU 104 may apply a yellow highlighting to target subject 214 within the real-time view 206. In another example, CPU 104 may enlarge and/or zoom-in on a particular region of real-time view 206 that includes target subject 214. In another embodiment, CPU 104 may dynamically render a visual callout that points to target subject 214 on a first end of the visual callout and which includes a text recitation of description 204 on an opposite end of the visual callout.

In another embodiment, visual identifier 216 includes a visual effect that is dynamically applied by CPU 104 to at least one region of real-time view 206 that does not include target subject 214. For example, CPU 104 may grey-out the surrounding areas or the entirety of real-time view 206 except for target subject 214. In another example, CPU 104 may pixelate, black-out, or eliminate the surrounding areas or the entirety of real-time view 206 except for target subject 214.

In response to rendering visual identifier 216 to target subject 214, CPU 104 provides real-time view 206 of the current scene, including visual identifier 216 of target subject 214, to at least one output device (e.g., display 145) as enhanced real-time view 212. In one or more embodiments, enhanced real-time view 212 may be recorded onto a local storage of visual monitoring device 100 (e.g., non-volatile storage 120) and/or provided in real-time to a remote device (e.g., device 152*a* or server 154) via a network connection. In another embodiment, CPU 104 may utilize the identified target subject 214 to focus a lens of image sensor 142. In another embodiment, enhanced real-time view 212 may be provided to an augmented reality system and/or virtual reality system.

In one or more embodiments, CPU 104 may identify more than one subject that matches description 204. In response to determining, more than one subject that matches description 204, CPU 104 provides a notification to at least one output device (e.g., display 145) that identifies that multiple target subjects were identified and requests additional natural language input to differentiate between the various potential target subjects. In another embodiment, CPU 104 applies visual identifier 216 to each of the subjects matching description 204 and continues to monitor natural language input 202 via microphone 108. In response to the additional natural language input resulting in none of the multiple subjects matching description 204, CPU 104 may dynamically remove visual identifier 216 from any subjects that matched description 204 prior to receiving the additional natural language input.

In one or more embodiments, CPU 104 continues to render visual identifier 216 within enhanced real-time view 212 while the identified target subject 214 remains visible in the current scene. In one or more embodiments, CPU 104 continually monitors real-time view 206 and determines when target subject 214 leaves and/or is no longer visible in the current scene. In response to determining target subject 214 has left and/or is no longer visible in the current scene, CPU 104 may autonomously remove visual identifier 216 from enhanced real-time view 212. In another embodiment, CPU 104 dynamically re-renders/re-applies visual identifier 216 to target subject 214 within enhanced real-time view 212 in response to determining target subject 214 has reentered and/or has become visible in the current scene. In another embodiment, CPU 104 may receive input from at least one input device that includes instructions to remove visual identifier 216 from within enhanced real-time view 212. In response to receiving the instructions to remove visual identifier 216, CPU 104 removes visual identifier 216 from enhanced real-time view 212.

Figure 3:
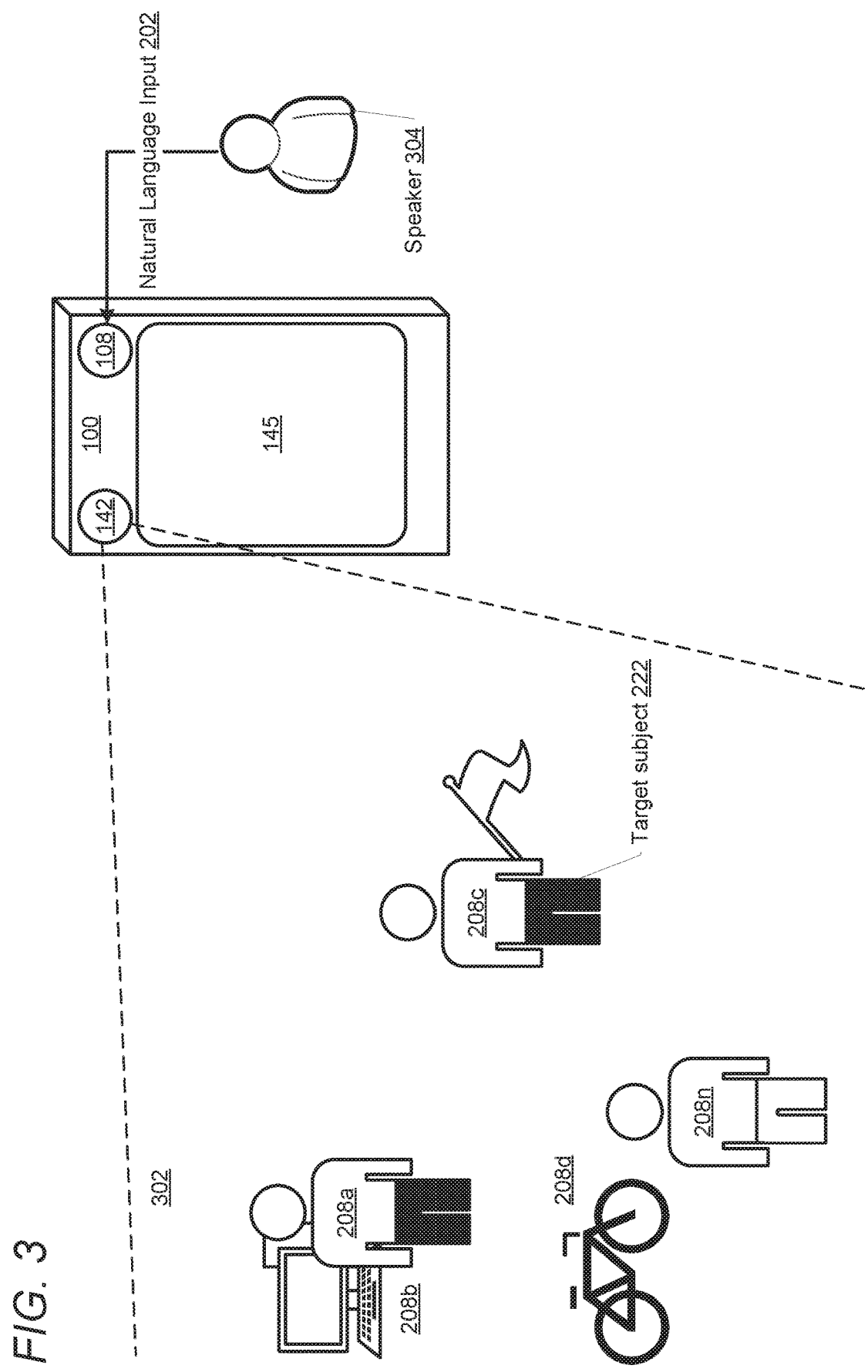
FIG. 3, illustrates a scene that includes a plurality of subjects, in accordance with one or more embodiments.

Referring now to FIG. 3, there is illustrated an example scene including a plurality of subjects. As illustrated, visual monitoring device 100 is capturing scene 302 including subjects 208*a-n*, via image sensor 142. Visual monitoring device 100 also receives natural language input 202, which includes spoken dialog from speaker 304, via microphone 108.

In a first example, CPU 104 receives, from microphone 108, natural language input 202 which includes a spoken language dialog that states "look at the person holding the flag". In this example, CPU 104 generates description 204 which identifies the particular subject as a person that is holding a flag. CPU 104 then analyzes real-time view 206 to identify a person holding a flag. In response to identifying a person holding a flag (subject 208c), CPU 104 renders a circle (visual identifier 216) around the person holding the flag within real-time view 206 to create enhanced real-time view 212 (which includes visual identifier 216).

In a second example, CPU 104 receives, from microphone 108, natural language input 202 which includes a spoken language dialog that states "focus on the person standing in front of the computer". Based on natural language input 202, CPU 104 determines that a spatial relationship exists between the target subject and another subject (the computer). Additionally, CPU 104 generates description 204 which identifies the particular subject as a person that is standing in front of a computer. CPU 104 then analyzes real-time view 206 to identify a person within real-time view 206 that is standing in front of a computer (subject 208a). In response to identifying a person within real-time view 206 that is standing in front of a computer, CPU 104 renders, within real-time view 206, an arrow (visual identifier 216) that points to the person standing in front of the computer to create enhanced real-time view 212 (which includes visual identifier 216).

In a third example, CPU 104 receives, from microphone 108, natural language input 202 which includes a spoken language dialog that states "the target is the black bicycle". In response to receiving natural language input 202, CPU 104 generates description 204 which identifies the particular subject as a bicycle that is black. CPU 104 then analyzes real-time view 206 to identify a black bicycle (e.g., subject 208d). In response to identifying a black bicycle within the current scene, CPU 104 applies, to real-time view 206, a black-out effect (visual identifier 216) to the surrounding areas of real-time view 206 that do not include the black bicycle to create enhanced real-time view 212 (which includes visual identifier 216).

In a fourth example, CPU 104 receives, from a keyboard input device, natural language input 202 which includes typed dialog that states "look at the person wearing the white pants". In response to receiving natural language input 202, CPU 104 generates description 204 which identifies the particular subject as a person wearing white pants. CPU 104 then analyzes real-time view 206 to identify a person wearing white pants (e.g., subject 208n). In response to identifying a person wearing white pants within the current scene, CPU 104 renders, within real-time view 206, a callout (visual identifier 216) that (1) points to a person wearing white pants at a first end and (2) and includes a text recitation of description 204 on an opposite end to create enhanced real-time view 212 (which includes visual identifier 216).

Figure 4D:
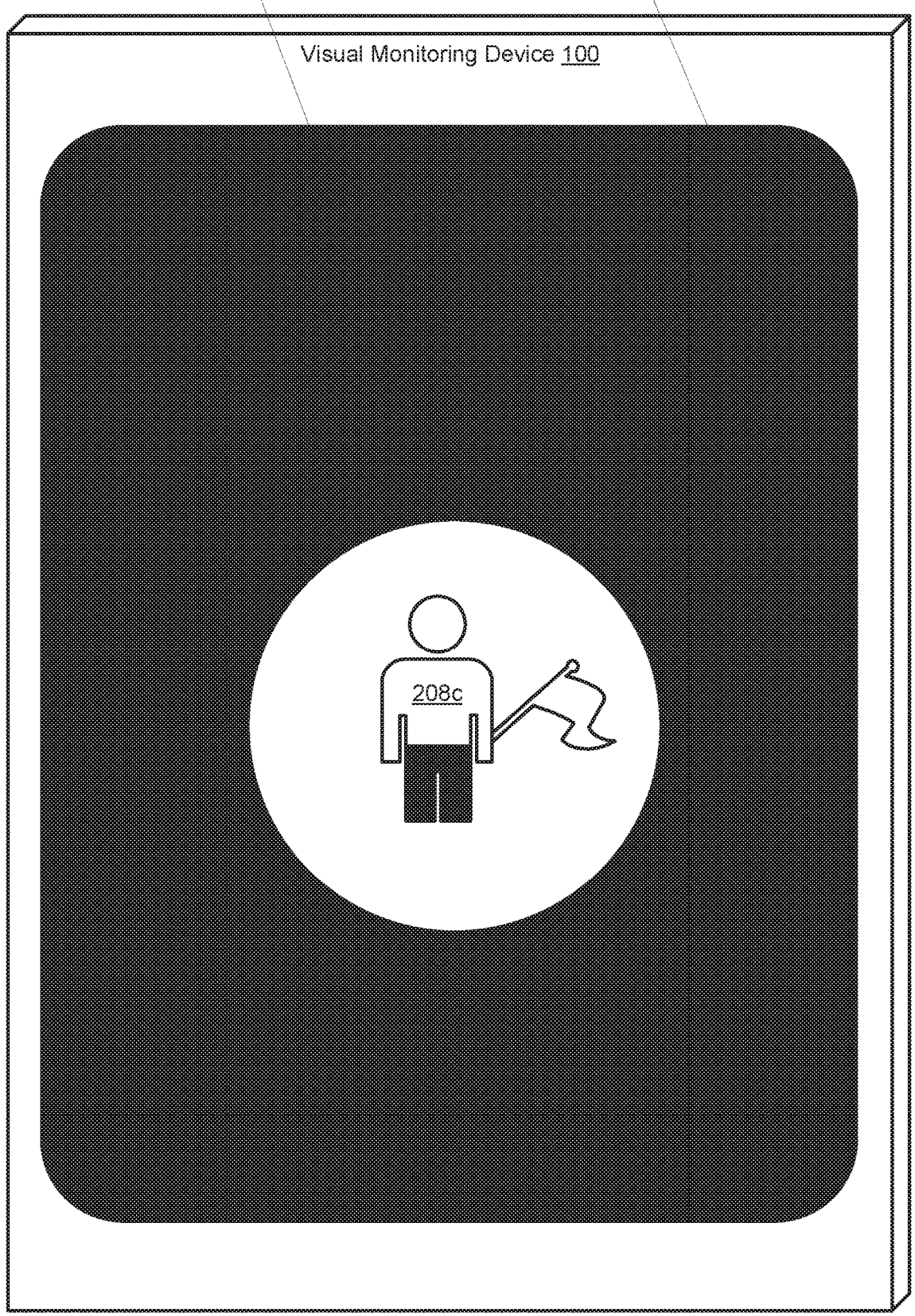
FIG. 4D illustrates a fourth example enhanced real-time view of a captured scene, in accordance with one or more embodiments.

Referring now to FIGS. 4A-D there are illustrated examples of an enhanced real-time view of a current scene. As illustrated in FIG. 4A, display 145 of visual monitoring device 100 is displaying enhanced real-time view 212, which includes subjects 208a-n and visual identifier 216. In the illustrated example of FIG. 4A, CPU 104 has identified subject 208c as target subject 214 and has rendered visual identifier 216 around subject 208c. As illustrated, visual identifier 216 includes a stylized circle that is rendered around subject 208c.

As illustrated in FIG. 4B, display 145 of visual monitoring device 100 is displaying enhanced real-time view 212, which includes subjects 208a-n and visual identifier 216. In the illustrated example of FIG. 4B, CPU 104 has identified subject 208c as target subject 214 and has rendered visual identifier 216 adjacent to subject 208c. As illustrated, visual identifier 216 includes a callout that points to subject 208c on a first end and includes a text recitation of description 204 at an opposite end.

As illustrated in FIG. 4C, display 145 of visual monitoring device 100 is displaying enhanced real-time view 212, which includes subjects 208a-n and visual identifier 216. In the illustrated example of FIG. 4C, CPU 104 has identified subject 208c as target subject 214 and has rendered visual identifier 216 proximate to subject 208c. As illustrated, visual identifier 216 includes an arrow that is rendered to point directly at subject 208c.

As illustrated in FIG. 4D, display 145 of visual monitoring device 100 is displaying enhanced real-time view 212, which includes subjects 208a-n and visual identifier 216. In the illustrated example of FIG. 4D, CPU 104 has identified subject 208c as target subject 214 and has rendered visual identifier 216 within enhanced real-time view 212. As illustrated, visual identifier 216 includes a black-out effect (visual identifier 216) that is applied to all surrounding areas of enhanced real-time view 212 that do not include subject 208c In one or more embodiments, enhanced real-time view 212 can then be viewed on a display (e.g., display 145) which enables a user to easily view target subject 214. In another embodiment, a camera/image sensor may more easily focus on target subject 214 within enhanced real-time view 212. It should also be noted that in other embodiments, all surrounding areas of enhanced real-time view 212 may be blurred instead of being blacked-out.

Figure 5:
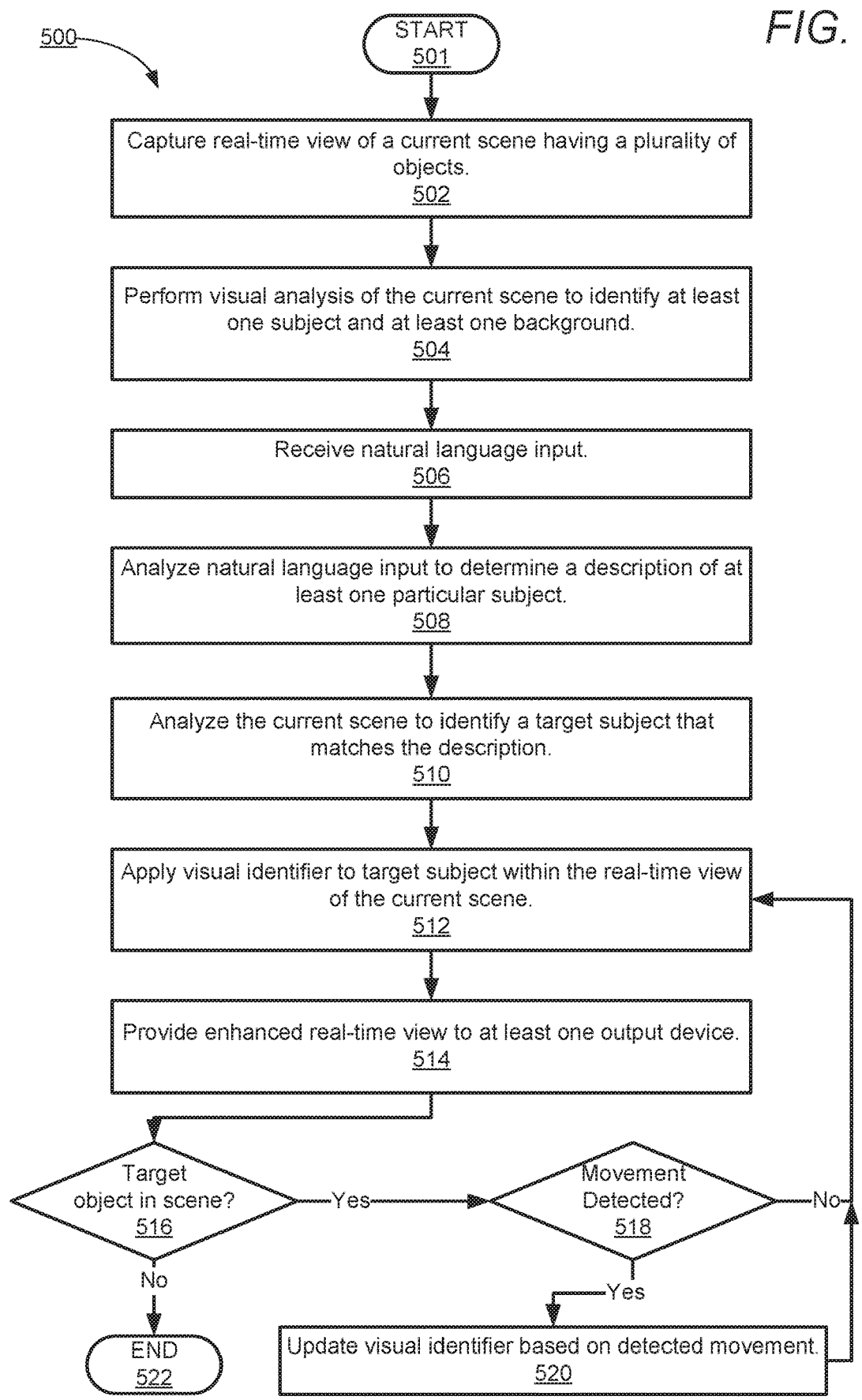
FIG. 5 is a flow chart illustrating a method for visually identifying at least one target subject within a real-time view of a current scene, in accordance with one or more embodiments.

Referring now to FIG. 5, there is depicted a high-level flow-chart illustrating a method for visually identifying at least one target subject within a real-time view of current scene, in accordance with one or more embodiments of the present disclosure. Aspects of the method are described with reference to the components of FIGS. 1 and 2. Several of the processes of the method provided in FIG. 5 can be implemented by a processor (e.g., CPU 104) executing software code of PU 117 within a visual monitoring device (e.g., visual monitoring device 100). The method processes described in FIG. 5 are generally described as being performed by components of visual monitoring device 100.

Method 500 commences at initiator block 501 then proceeds to block 502. At block 502, visual monitoring device 100 captures a real-time view (e.g., real-time view 206) of a current scene (e.g., scene 302) having a plurality of objects. At block 504, CPU 104 performs a visual analysis of the current scene to identify at least one subject (subjects 208a-n) from among the plurality of objects in the scene. CPU 104 may also identify background 210 in the current scene. At block 506, CPU 104 receives a natural language input (e.g., natural language input 202) via an input device (e.g., microphone 108). At block 508, CPU 104 analyzes the natural language input to determine a description (e.g., description 204) that describes at least one particular subject in the current scene. Description 204 may further describe additional subjects that are a focus of attention in the current scene, a description of subjects in the current scene, and/or a description of one or more subjects relative to a background and/or other subjects in the current scene. At block 510, CPU 104 analyzes the current scene to identify at least one target subject (e.g., target subject 214) that matches the description of the particular subject. At block 512, CPU 104 applies and/or renders a visual identifier (e.g., visual identifier 216) to a real-time view of the current scene to increase a visibility of target subject 214. At block 514, CPU 104 provides an enhanced real-time view (e.g., enhanced real-time view 212) that includes the visual identifier to at least one output device (e.g., display 145). At block 516, CPU 104 determines whether the at least one target subject is present within the real-time view of the current scene. In response to determining at block 516 that the at least one target subject is not present within the enhanced real-time view 516, method 500 terminates at block 522.

In response to determining the at least one target subject is present within the real-time view, CPU 104 determines whether the at least one target subject has moved within the enhanced real-time view (block 518). In response to determining the at least one target subject has not moved within the real-time view, method 500 continues back to block 512. In response to determining (at block 518) that the at least one target subject has moved within the real-time view, CPU 104 dynamically updates the position of the visual identifier within the enhanced real-time view based on the detected movement of the target subject within the real-time view (block 520) and method 500 continues to block 512.

In the above-described flow charts of FIG. 5, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:
1. A method comprising:
capturing, by at least one image sensor, a real-time view of a current scene;
receiving, a natural language input in real-time with the capturing of the real-time view;

identifying, within the natural language input, a description of at least one particular subject within the current scene;

analyzing the captured real time view of the current scene to identify, within the current scene, at least one target subject from among the at least one subject that matches the description of the at least one particular subject, the analyzing comprising differentiating among multiple identified subjects from other objects to identify the at least one target subject, based on a respective matching score determined between the description from the natural language input and each of the multiple identified subjects; and in response to identifying the at least one target subject within the current scene: applying, to the real-time view of the current scene, at least one visual identifier that increases a visibility of the at least one target subject within the real-time view of the current scene; and providing, to at least one output device, the real-time view of the current scene including the at least one visual identifier.

2. The method of claim 1, wherein:

the current scene includes a plurality of objects;

performing the visual analysis of the current scene further comprises, identifying:

the at least one subject from among the plurality of objects, wherein the at least one subject is a focus of attention in the current scene; and a background of the current scene; and the analyzing further comprises differentiating among the multiple identified subjects within the current scene, based on at least one prepositional phrase or relationship terms and phrases included in the description.

3. The method of claim 1, further comprising:

monitoring a movement of the at least one subject within the current scene; and dynamically updating a position of the at least one visual identifier within the real-time view based on the monitored movement.

4. The method of claim 1, wherein applying the at least one visual identifier further comprises at least one of:

dynamically rendering an identifying object adjacent to the at least one target subject within the real-time view of the current scene; and dynamically applying, to the real-time view of the current scene, a color adjustment to at least one region that includes the at least one target subject.

5. A data processing system comprising:

at least one image sensor that captures a real-time view of a current scene;

at least one input device that captures a natural language input including verbal utterances of at least one speaker, the natural language input captured in real-time with the capturing of the real-time view; and at least one processor that:

identifies, within the natural language input, a description of at least one particular subject within the current scene;

analyzes the captured real time view of the current scene to identify at least one target subject within the current scene from among the at least one subject that matches the description of the at least one particular subject within the current scene, wherein to identify the at least one target subject the processor differentiates among multiple identified subjects from other objects, based on a respective matching score determined between the description from the natural language input and each of the multiple identified subjects; and in response to identifying the at least one target subject within the current scene: applies, to the real-time view of the current scene, at least one visual identifier that increases a visibility of the at least one target subject within the real-time view of the current scene; and provides, to at least one output device, the real-time view of the current scene including the at least one visual identifier.

6. The data processing system of claim 5, wherein:

the current scene includes a plurality of objects;

the at least one processor, in performing the visual analysis of the current scene, identifies:

the at least one subject from among the plurality of objects, wherein the at least one subject is a focus of attention in the current scene; and a background of the current scene; and in analyzing the captured real time view of the current scene, the at least one processor differentiates among the multiple identified subjects within the current scene, based on at least one prepositional phrase or relationship terms and phrases included in the description.

7. The data processing system of claim 5, wherein the at least one processor:

monitors a movement of the at least one subject within the real-time view of the current scene; and dynamically updates a position of the at least one visual identifier within the real-time view based on the monitored movement.

8. The data processing system of claim 5, wherein in applying the at least one visual identifier, the at least one processor performs at least one of:

dynamically renders an identifying object adjacent to the at least one target subject within the real-time view of the current scene; and dynamically applies, to the real-time view of the current scene, a color adjustment to at least one region that includes the at least one target subject.

9. A computer program product comprising:

a non-transitory computer readable storage device; and program code on the computer readable storage device that, when executed by a processor associated with a data processing system, enables the data processing system to provide the functionality of:

capturing, by at least one image sensor, a real-time view of a current scene;

receiving, in real-time, a natural language input;

identifying, within the natural language input, a description of at least one particular subject within the current scene;

analyzing the captured real time view of the current scene to identify at least one target subject within the current scene from among the at least one subject that matches the description of the at least one particular subject, the analyzing comprising differentiating among multiple identified subjects from other objects to identify the at least one target subject, based on a respective matching score determined between the description from the natural language input and each of the multiple identified subjects; and in response to identifying the at least one target subject within the current scene; applying, to the real-time view of the current scene, at least one visual identifier that increases a visibility of the at least one target subject within the real-time view of the current scene and providing, to at least one output device, the real-time view of the current scene including the at least one visual identifier.

10. The computer program product of claim 9, wherein:
the current scene includes a plurality of objects;
the program code for performing the visual analysis of the current scene further comprising code for identifying:
the at least one subject from among the plurality of objects, wherein the at least one subject is a focus of attention in the current scene; and
a background of the current scene; and
the program code for analyzing the captured real time view of the current scene comprises code for differentiating among the multiple identified subjects within the current scene from other objects, based on at least one prepositional phrase or relationship terms and phrases included in the description.

11. The computer program product of claim 9, the program code further comprising code for:
monitoring a movement of the at least one subject within the current scene; and
dynamically updating a position of the at least one visual identifier within the real-time view based on the monitored movement.

12. The computer program product of claim 9, the program code for applying the at least one visual identifier further comprising code for performing at least one of:
dynamically rendering an identifying object adjacent to the at least one target subject within the real-time view of the current scene; and
dynamically applying, to the real-time view of the current scene, a color adjustment to at least one region that includes the at least one target subject.

13. The method of claim 1, wherein identifying, within the natural language input, the description of at least one particular subject within the current scene further comprises identifying, within the natural language input, at least one of: a description of an appearance of the at least one particular subject within the current scene; and a description of a relationship of the at least one particular subject to another object within the current scene.

14. The computer program product of claim 9, wherein the program code for identifying, within the natural language input, the description of at least one particular subject within the current scene further comprises program code for identifying, within the natural language input, at least one of: a description of an appearance of the at least one particular subject within the captured real time view of the current scene; and a description of a relationship of the at least one particular subject to another object within the current scene.

15. The method of claim 1, wherein differentiating among multiple identified subject comprises:
determining the respective matching score between the description from the natural language input and the at least one subject, the matching score indicating a level of confidence in a determined match; and
identifying a subject as the target subject only in response to the matching score meeting or exceeding a predetermined matching threshold.

16. The method of claim 1, further comprising:
determining when a spatial relationship exists between a first subject and a second subject in the current scene based on relationship terms and/or phrases in a description provided as the natural language input;
identifying a location of a second subject within the real-time view based on the description and location of the first subject.

17. The method of claim 1, further comprising:
in response to being unable to identify a target subject from the description:
providing a notification indicating that the target subject cannot be found; and
including within the notification a request for input of additional natural language input to differentiate between potential target subjects; and
applying the visual identifier to the target subject in response to receiving the additional natural language input that enables the processor to conclusively identify the target object.

18. The method of claim 1, wherein applying the at least one visual identifier comprises enlarging or zooming-in on a particular region of the real-time view that includes the target subject and focusing a lens of the image sensor by utilizing the identified target subject.

19. The method of claim 1, wherein analyzing the captured real time view of the current scene to identify the at least one target subject, further comprises:
in response to determining that there is more than one subject within the current scene that matches the description:
providing a notification to at least one output device that identifies that multiple target subjects were identified; and
requests additional natural language input to differentiate between the various potential target subjects.

20. The method of claim 1, further comprising:
converting, via a speech-to-text module, the natural language input from any of a plurality of unique languages to a particular, configured language of the visual monitoring device.

* * * * *